(12) United States Patent
Agarwal

(10) Patent No.: US 8,700,652 B2
(45) Date of Patent: Apr. 15, 2014

(54) SYSTEMS AND METHODS TO GENERATE AND UTILIZE A SYNONYM DICTIONARY

(75) Inventor: Swati Agarwal, Sunnyvale, CA (US)

(73) Assignee: eBay, Inc., San Jose, CA (US)

( * ) Notice: Subject to any disclaimer, the term of this patent is extended or adjusted under 35 U.S.C. 154(b) by 641 days.

(21) Appl. No.: 12/638,925

(22) Filed: Dec. 15, 2009

(65) Prior Publication Data

US 2011/0145268 A1 Jun. 16, 2011

(51) Int. Cl.
*G06F 17/30* (2006.01)

(52) U.S. Cl.
USPC ............................. 707/765; 707/771

(58) Field of Classification Search
USPC .................. 707/769, E17.017, 765, 771
See application file for complete search history.

(56) References Cited

U.S. PATENT DOCUMENTS

| 6,845,354 B1 * | 1/2005 | Kuo et al. ..................... 704/9 |
| 2005/0055341 A1 * | 3/2005 | Haahr et al. ..................... 707/3 |
| 2005/0144064 A1 | 6/2005 | Calabria et al. |
| 2008/0133479 A1 * | 6/2008 | Zelevinsky et al. .............. 707/3 |
| 2008/0195601 A1 * | 8/2008 | Ntoulas et al. ..................... 707/5 |
| 2009/0076927 A1 | 3/2009 | Sridhar et al. |
| 2009/0171948 A1 | 7/2009 | Solomon et al. |
| 2009/0240586 A1 | 9/2009 | Ramer et al. |
| 2010/0293179 A1 * | 11/2010 | Chaudhuri et al. ........... 707/759 |
| 2011/0035403 A1 * | 2/2011 | Ismalon ..................... 707/769 |

FOREIGN PATENT DOCUMENTS

WO WO-2011075488 A1 6/2011

OTHER PUBLICATIONS

"International Application Serial No. PCT/US2010/060348, Search Report mailed Feb. 15, 2011", 7.
"International Application Serial No. PCT/US2010/060348, Written Opinion mailed Feb. 15, 2011", 7.

* cited by examiner

*Primary Examiner* — Shiow-Jy Fan
(74) *Attorney, Agent, or Firm* — Schwegman, Lundberg & Woessner, P.A.

(57) ABSTRACT

Systems and methods to identify synonyms are described. The system generates demand information based on a first plurality of queries. Further, the system identifies a second plurality of queries as a first cluster of queries from the first plurality of queries based on the demand information, and identifies a first synonym set based on an association map that comprises a first plurality of constraints identified from the second plurality of queries. Finally, the system stores the first synonym set in a synonym dictionary.

14 Claims, 14 Drawing Sheets

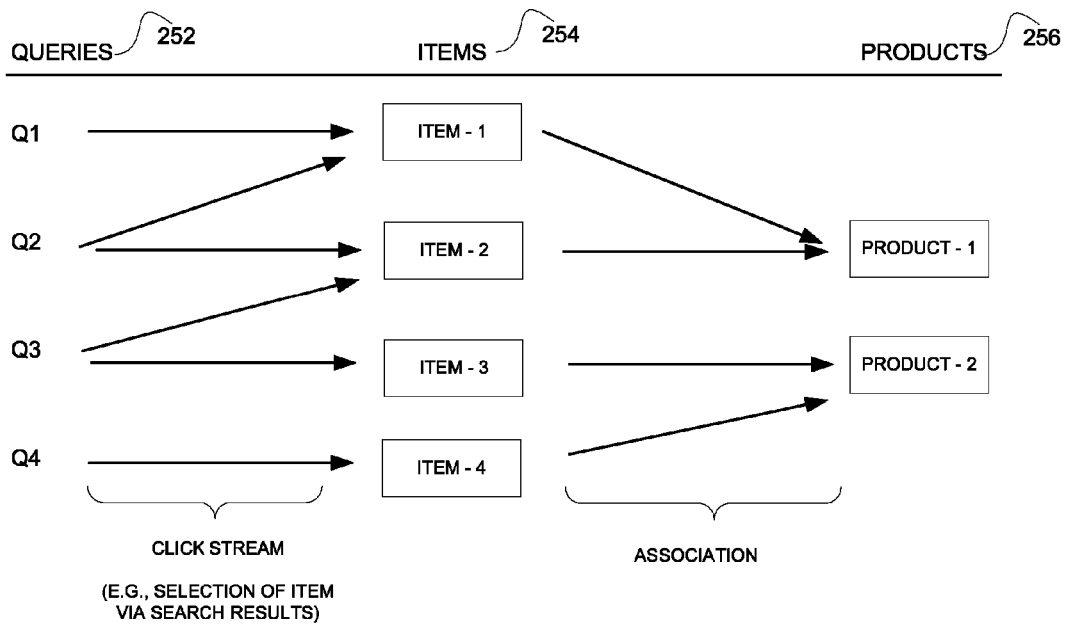

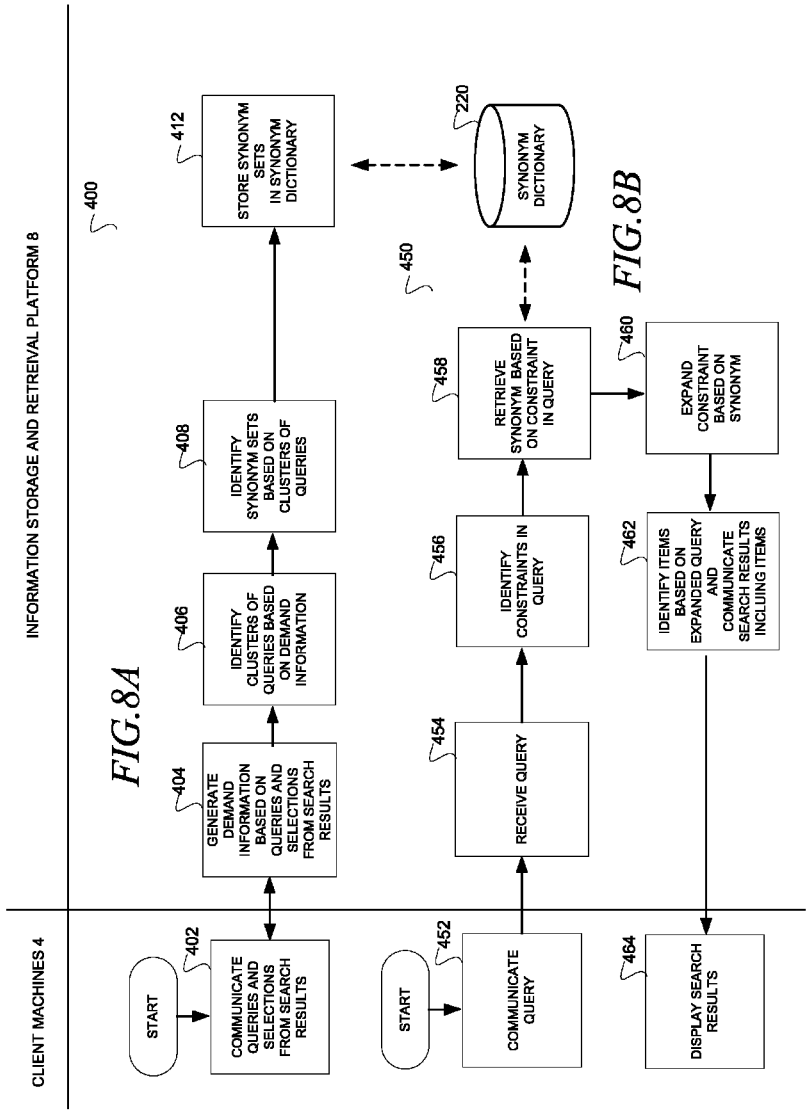

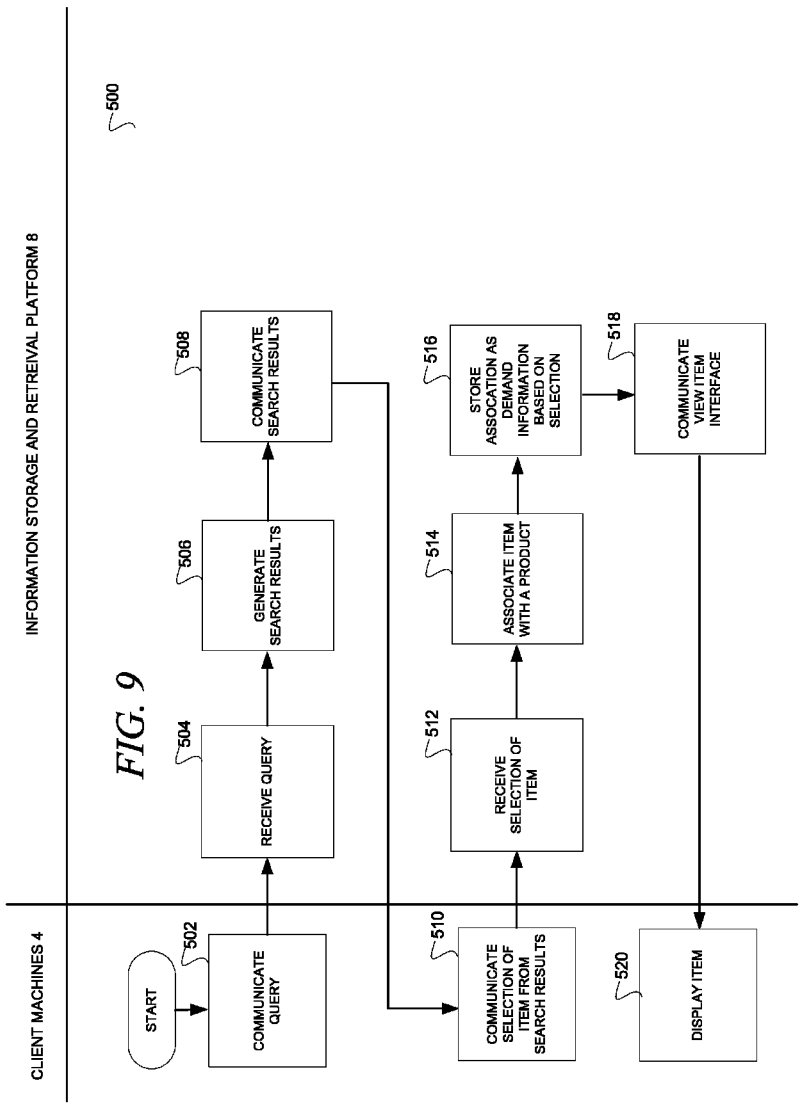

SYSTEMS AND METHODS TO GENERATE AND UTILIZE A SYNONYM DICTIONARY

TECHNICAL FIELD

This disclosure relates to the technical field of data communications and more particularly to systems and methods to generate and utilize a synonym dictionary.

RELATED ART

Users may search databases by entering queries that include constraints. The constraints may include phrases (e.g., N-grams), words, letters, acronyms, and so forth. Sometimes the constraints in a query may be expanded prior to application of the query to a database. For example, a constraint may be expanded to include the original constraint and a synonym of the constraint. Accordingly, a query may be expanded to include synonyms to improve the precision and recall of the search results.

BRIEF DESCRIPTION OF THE DRAWINGS

Embodiments illustrated, by way of example and not limitation, in the figures of the accompanying drawings, in which:

FIG. 5A is a block diagram illustrating an overview of a method to generate demand information, according to an embodiment;

FIG. 5B is a block diagram illustrating demand information, according to an embodiment;

FIG. 8A is a block diagram illustrating a method, according to an embodiment, to generate a synonym dictionary;

FIG. 8B is a block diagram illustrating a method, according to an embodiment, to utilize a synonym dictionary;

FIG. 9 is a flow chart illustrating a method, according to an embodiment, to generate demand information;

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

Systems and methods to generate and utilize a synonym dictionary, according to various example embodiments of the disclosed subject matter, are described and claimed herein. Various embodiments are described below in connection with the figures provided herein.

Figure 1:
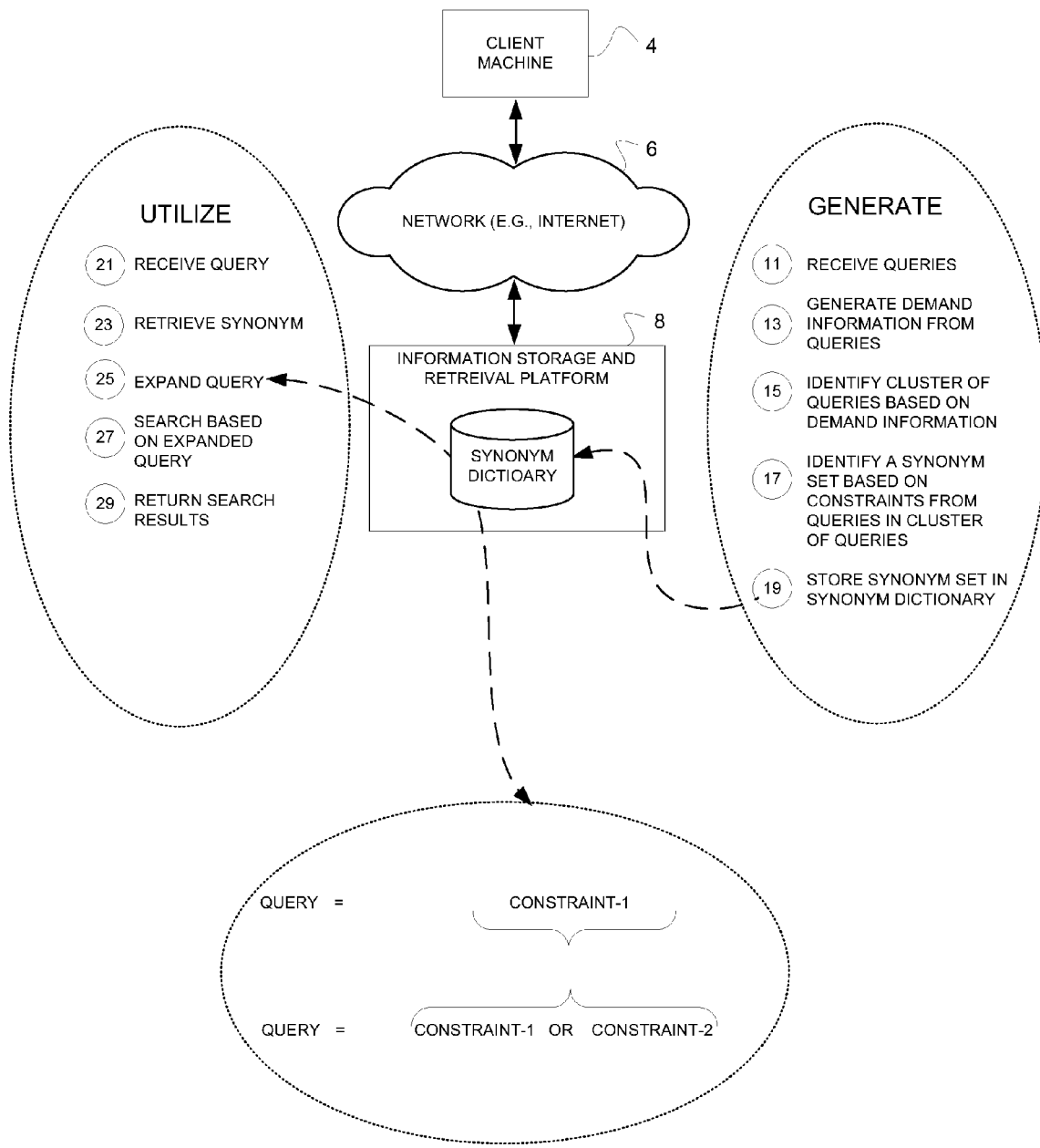
FIG. 1 illustrates a system, according to an embodiment, to generate and utilize a synonym dictionary.

FIG. 1 illustrates a system 2, according to an embodiment, to generate and utilize a synonym dictionary. The system 2 includes a client machine 4 that may receive a query from a user and communicate the query over a network 6 (e.g., the Internet) to an information storage and retrieval platform 8 that processes the query to then return search results to the user. According to one embodiment such processing may include a generation and/or a utilization of a synonym dictionary.

Generation of Synonym Dictionary

The information storage and retrieval platform 8 may generate a synonym dictionary by identifying synonym sets. Broadly, the information storage and retrieval platform 8 may identify a synonym set by executing a series of operations illustrated on the right of FIG. 1 commencing at operation 11 with the information storage and retrieval platform 8 receiving a query. At operation 13, the information storage and retrieval platform 8 may generate demand information for the query by processing selections from the user that are related to the query. For example, the demand information may include selections related to items that were communicated in search results to the client machine 4 in response to the query. At operation 15, the information storage and retrieval platform 8 may identify clusters of queries based on the demand information. For example, the demand information may be used to identify queries that are clustered around a common product. Next, the information storage and retrieval platform may filter constraints from a cluster of queries by generating a distance matrix. The distance matrix may be used to identify the logical distance between the constraints within a query. For example, the logical distance between the constraints "PLAYSTATION" and "4 GB" in the query "PLAYSTATION 3 4 GB" is two. Further, the constraints within a query that are positioned further apart than a predetermined threshold may be filtered. At operation 17, the information storage and retrieval platform 8 may identify a synonym set based on the remaining constraints taken from the cluster of queries. In one embodiment, the information storage and retrieval platform 8 may generate an association matrix that facilitates a comparison of the constraints within the different queries in order to identify the synonym sets. For example, the constraints "PLAYSTATION 3" and "PS3" may be identified as a synonym set. Finally, at operation 19, the information storage and retrieval platform 8 may store the synonym set in a synonym dictionary.

Utilization of Synonym Dictionary

The information storage and retrieval platform 8 may utilize a synonym dictionary to identify a synonym set. The information storage and retrieval platform 8 may identify the synonym set by executing a series of operations that commence at operation 21, with the reception of a query. At operation 23, the information storage and retrieval platform 8 may retrieve a synonym from the synonym dictionary based on a constraint in the query. For example, the constraint "PLAYSTATION 3" may be received in the query and utilized to lookup a synonym in the synonym dictionary (e.g., "PS3"). At operation 25, the information storage and retrieval platform 8 may expand the received constraint. For example, the information storage and retrieval platform 8 may expand the constraint "PLAYSTATION 3" to "PLAYSTATION 3 OR PS 3." At operation 27, the information storage and retrieval platform 8 may retrieve search results from a database (not shown) based on the expanded query and at operation 29 the information storage and retrieval platform 8 may communicate the search results to the client machine 4.

Figure 2:
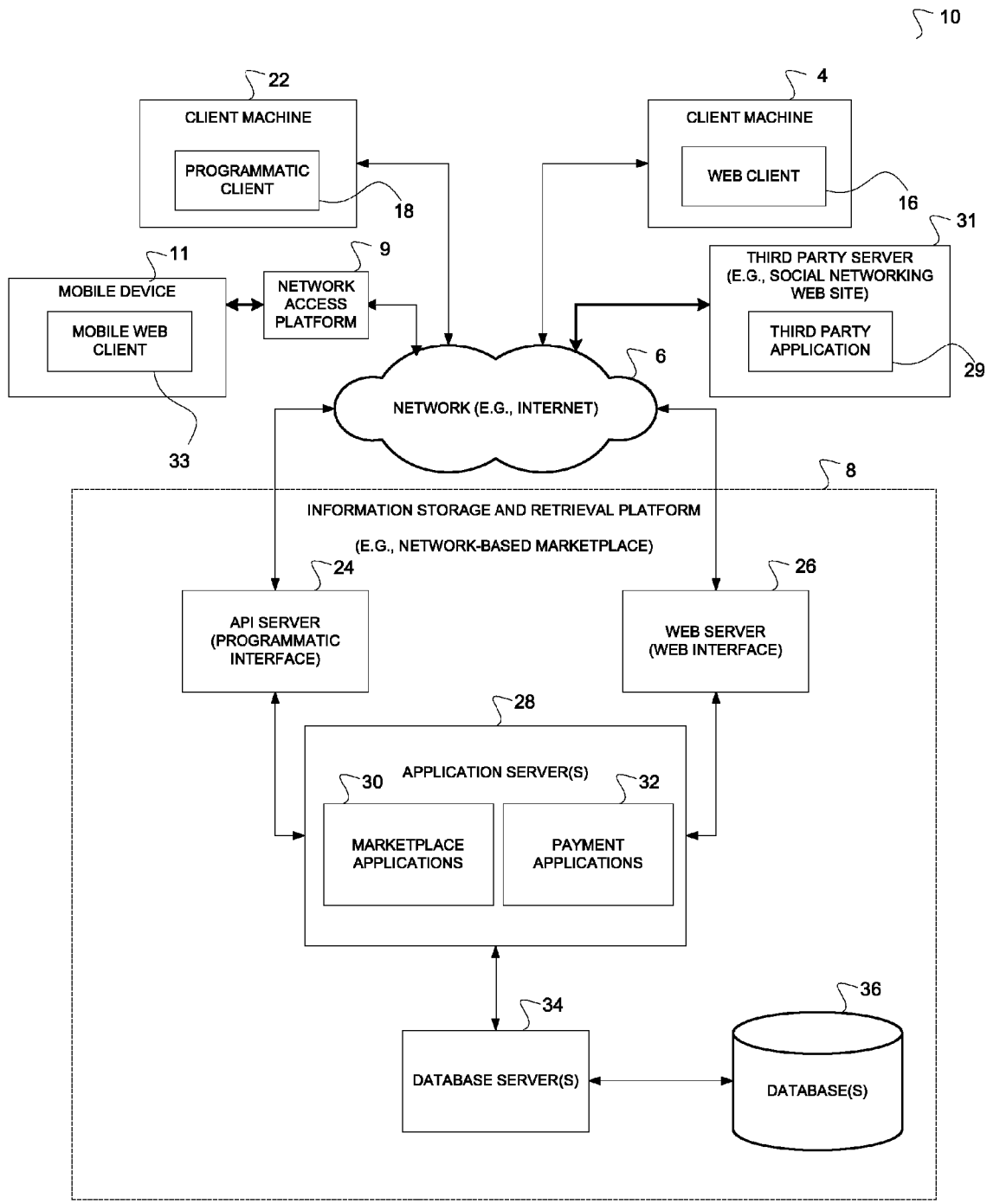
FIG. 2 further illustrates a system, according to an embodiment, to generate and utilize a synonym dictionary.

FIG. 2 is a network diagram depicting a networked system 10, within which one example embodiment may be deployed. The networked system 10 corresponds to the system 2 in FIG. 1 and, accordingly, the same or similar references have been used to indicate the same or similar features unless otherwise indicated. An information storage and retrieval platform 8 provides server-side functionality, via a network 6 (e.g., the Internet or Wide Area Network (WAN)) to one or more clients. FIG. 2 illustrates, for example, a web client 16 (e.g., a browser, such as the Internet Explorer browser developed by Microsoft Corporation of Redmond, Wash. State) executing on client machine 4, a programmatic client 18 executing on client machine 22, and a mobile web client 33 executing on mobile device 11. For example, the mobile web client 33 may communicate with the information storage and retrieval platform via a network access platform 8 and be embodied as one or more mobile modules that are used to support the Blackberry™ wireless hand held business or smart phone manufactured by Research In Motion of Waterloo, Ontario.

An Application Program Interface (API) server 24 and a web server 26 are coupled to, and provide programmatic and web interfaces respectively to, one or more application servers 28. The information storage and retrieval platform 8 may be embodied as a network-based marketplace such as eBay, The Worlds Online Marketplace, owned by eBay Inc., of San Jose, Calif. According to this embodiment, the application servers 28 may host one or more marketplace applications 30 and payment applications 32. The application servers 28 are, in turn, shown to be coupled to one or more database servers 34 that facilitate access to one or more databases 36.

The marketplace applications 30 may provide a number of marketplace functions and services to users that access the information storage and retrieval platform 8. The payment applications 32 may likewise provide a number of payment services and functions to users. The payment applications 32 may allow users to accumulate value in accounts and then to later redeem the accumulated value for products (e.g., goods or services) that are made available via the marketplace applications 30. The value may be accumulated in a commercial currency, such as the U.S. dollar, or a proprietary currency, such as "points." While the marketplace applications 30 and payment applications 32 are shown in FIG. 2 to both form part of the information storage and retrieval platform 8, it will be appreciated that, in alternative embodiments, the payment applications 32 may form part of a payment service that is separate and distinct from the information storage and retrieval platform 8.

Further, while the networked system 10 shown in FIG. 2 employs client-server architecture, embodiments of the present disclosure are, of course, not limited to such an architecture and could equally well find application in a distributed, or peer-to-peer, architecture system, for example. The various marketplace applications 30 and payment applications 32 could also be implemented as standalone software programs, which do not necessarily have networking capabilities.

The web client 16 and mobile web client 33 access the various marketplace applications 30 and payment applications 32 via the web interface supported by the web server 26. Similarly, the programmatic client 18 accesses the various services and functions provided by the marketplace applications 30 and payment applications 32 via the programmatic interface provided by the API server 24. The programmatic client 18 may, for example, be a seller application (e.g., the TurboLister application developed by eBay Inc., of San Jose, Calif.) to enable sellers to author and manage listings on the information storage and retrieval platform 8 in an off-line manner, and to perform batch-mode communications between the programmatic client 18 and the information storage and retrieval platform 8.

FIG. 2 also illustrates a third party application 29, executing on a third party server machine 31, as having programmatic access to the networked system 10 via the programmatic interface provided by the API server 24. The third party website may further communicate user interfaces to the client machine 22, 4 or mobile device 11.

The mobile device 11 may be embodied as a mobile phone, a personal digital assistant (PDA), a cell phone, or any other wireless device that is capable of communicating with the information storage and retrieval platform 8. For example, the mobile device 11 may be embodied as an iPhone mobile phone manufactured by Apple, Inc. of Cupertino, Calif. or, as previously mentioned, a Blackberry™ mobile phone manufactured by Research In Motion of Waterloo, Ontario.

Marketplace and Payment Applications

Figure 3:
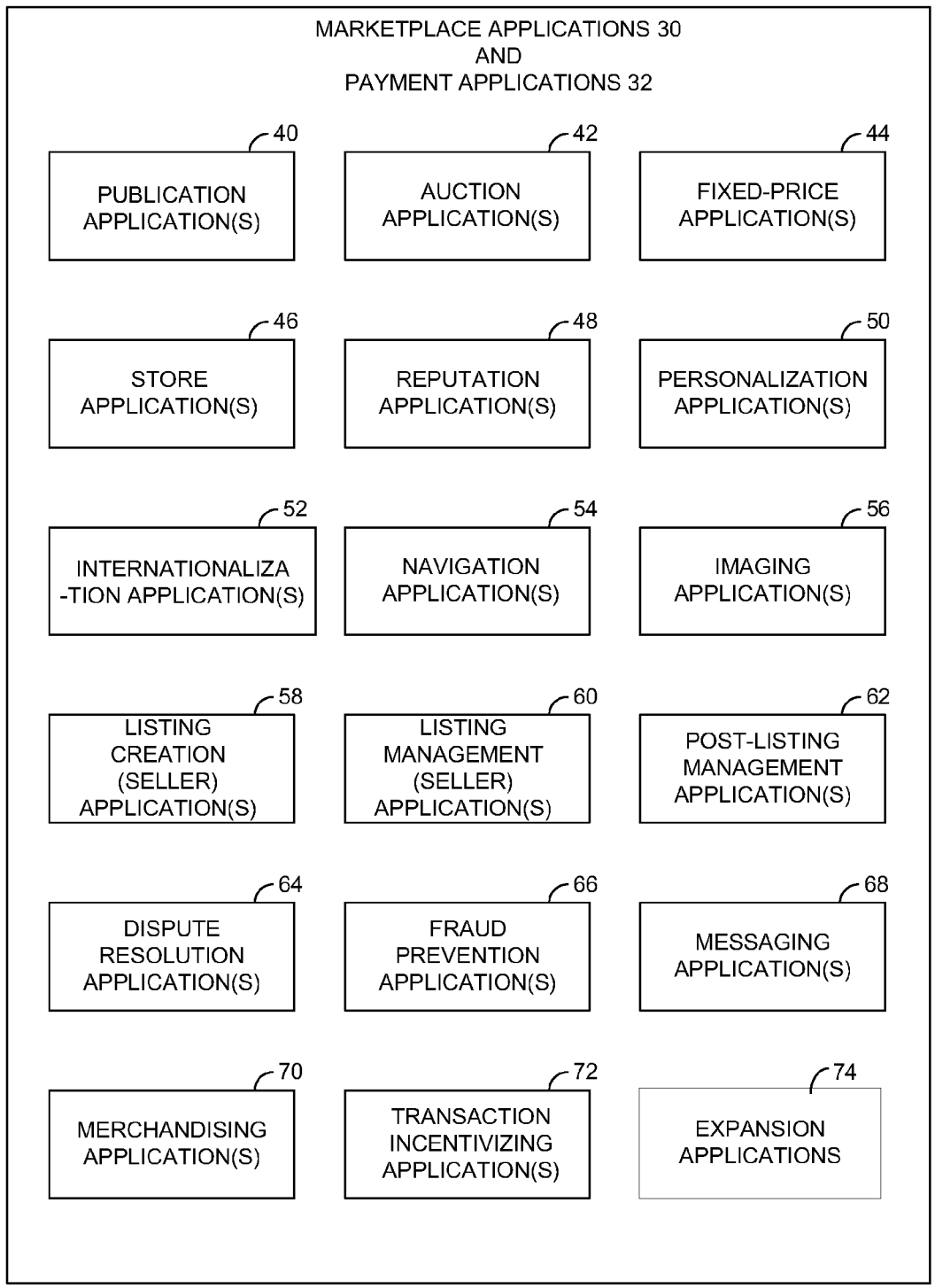
FIG. 3 is a block diagram illustrating marketplace applications and payment applications, according to an embodiment.

FIG. 3 is a block diagram illustrating marketplace applications 30 and payment applications 32 that, in one example embodiment, are provided as part of the networked system 10 of FIG. 2. The marketplace applications 30 and payment applications 32 may be hosted on dedicated or shared server machines, as shown on FIG. 2, that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 36 via the database servers 34, as shown on FIG. 2.

The information storage and retrieval platform 8 of FIG. 2 may provide a number of publishing, listing and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace applications 30 are shown to include at least one publication application 40 and one or more auction applications 42 which support auction-format listing and price setting mechanisms (e.g., English, Dutch, Vickrey, Chinese, Double, Reverse auctions, etc.). The various auction applications 42 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 44 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store application(s) 46 allows a seller to group listings within a "virtual" store, which may be branded and otherwise personalized by and for the seller. Such a virtual store may also offer promotions, incentives and features that are specific and personalized to a relevant seller.

Reputation applications 48 allow users that transact, utilizing the information storage and retrieval platform 8, to establish, build and maintain reputations, which may be made available and published to potential trading partners. Consider that where, for example, the information storage and retrieval platform 8 supports person-to-person trading, users may otherwise have no history or other reference information whereby the trustworthiness and credibility of potential trading partners may be assessed. The reputation applications 48 allow a user to establish a reputation within the information storage and retrieval platform 8 over time, for example, through feedback provided by other transaction partners and by the computation of a feedback score based on the feedback. For example, the feedback score may be publicly displayed by the information storage and retrieval platform 8. Other potential trading partners may then reference such a feedback score for the purposes of assessing credibility and trustworthiness.

Personalization applications 50 allow users of the information storage and retrieval platform 8 to personalize various aspects of their interactions with the information storage and retrieval platform 8 For example, a user may, utilizing an appropriate personalization application 50, create a personalized reference page at which information regarding transactions to which the user is (or has been) a party may be viewed. Further, a personalization application 50 may enable a user to personalize listings and other aspects of their interactions with the networked system 10 and other parties.

The networked system 10 may support a number of marketplaces that are customized, for example, for specific geographic regions. A version of the networked system 10 may be customized for the United Kingdom, whereas another version of the networked system 10 may be customized for the United States. Some of these versions may operate as an independent marketplace, or may be customized (or internationalized) presentations of a common underlying marketplace. The networked system 10 may accordingly include a number of internationalization applications 52 that customize information (and/or the presentation of information) by the networked system 10 according to predetermined criteria (e.g., geographic, demographic or marketplace criteria). For example, the internationalization applications 52 may be used to support the customization of information for a number of regional websites that are operated by the networked system 10 and that are accessible via respective servers 24 and 26, both of FIG. 2.

Navigation of the information storage and retrieval platform 8 may be facilitated by one or more navigation applications 54. For example, the information storage and retrieval platform 8 may receive search information to search for items on the network-based marketplace and a processing application may process that request. A browse application may allow users to browse various category, catalogue, or inventory data structures according to which listings may be classified within the networked system 10. Various other navigation applications may be provided to supplement the search and browsing applications.

In order to make listings available via the networked system 10 as visually informing and attractive as possible, the marketplace applications 30 may include one or more imaging applications 56 with which users may upload images for inclusion within listings. An imaging application 56 also operates to incorporate images within viewed listings. The imaging applications 56 may also support one or more promotional features, such as image galleries that are presented to potential buyers. For example, sellers may pay an additional fee to have an image included within a gallery of images for promoted items.

Listing creation applications 58 allow sellers to conveniently author listings pertaining to goods or services that they wish to transact via the information storage and retrieval platform 8, while the listing management applications 60 allow sellers to manage such listings. Specifically, where a particular seller has authored and/or published a large number of listings, the management of such listings may present a challenge. The listing creation applications may further include a processing module, communication module, and listing module that facilitate a buyer watching for specific types of listings. The listing management applications 60 provide a number of features (e.g., auto-relisting, inventory level monitors, etc.) to assist the seller in managing such listings.

One or more post-listing management applications 62 may also assist sellers with a number of activities that may typically occur post-listing. For example, upon completion of an auction facilitated by one or more auction applications 42, a seller may wish to leave feedback regarding a particular buyer. To this end, a post-listing management application 62 may provide an interface to one or more reputation applications 48, so as to allow the seller to conveniently provide feedback regarding multiple buyers to the reputation applications 48.

Dispute resolution applications 64 provide mechanisms whereby disputes arising between transacting parties may be resolved. For example, the dispute resolution applications 64 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 66 implement fraud detection and prevention mechanisms to reduce the occurrence of fraud within the information storage and retrieval platform 8.

Messaging applications 68 are responsible for the generation and delivery of messages to users of the information storage and retrieval platform 8, with such messages, for example, advising users regarding the status of listings at the information storage and retrieval platform 8 (e.g., providing "outbid" notices to bidders during an auction process or providing promotional and merchandising information to users). Respective messaging applications 68 may utilize any one of a number of message delivery networks and platforms to deliver messages to users. For example, messaging applications 68 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), Worldwide Interoperability for Microwave Access (e.g., WiMAX—IEEE 802.16) networks.

Merchandising applications 70 support various merchandising functions that are made available to sellers to enable sellers to increase sales via the information storage and retrieval platform 8. The merchandising applications 70 also operate the various merchandising features that may be invoked by sellers and may monitor and track the success of merchandising strategies employed by sellers.

Expansion applications 74 may support the generation and utilization of a synonym dictionary. For example, the information storage and retrieval platform 8 may receive and process queries to generate or utilize the synonym dictionary.

Data Structures

Figure 4A:
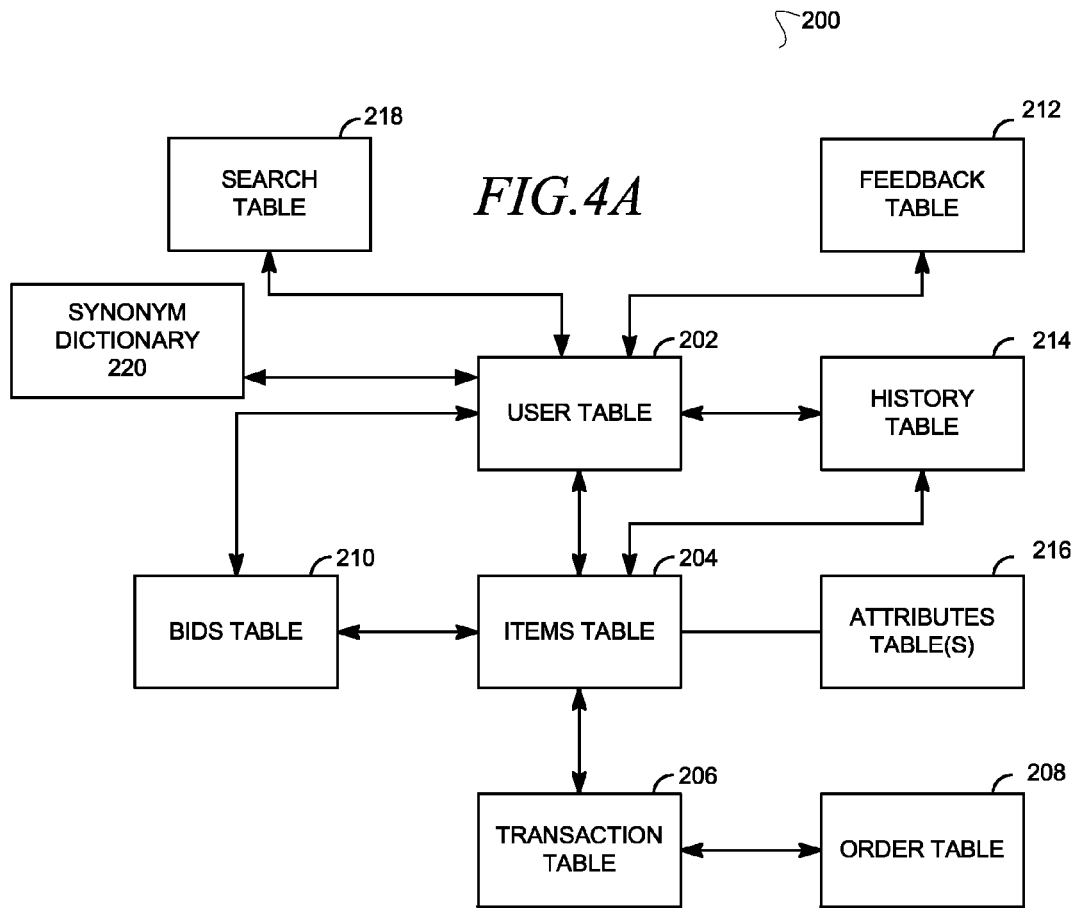
FIG. 4A is a block diagram illustrating tables, according to an embodiment.

FIG. 4A is a high-level entity-relationship diagram, illustrating various tables 200 that may be maintained within the databases 36 of FIG. 2, and that are utilized by and support the marketplace applications 30 and payment applications 32 both of FIG. 3. A user table 202 contains a record for registered users of the information storage and retrieval platform 8 of FIG. 2. A user may operate as a seller, a buyer, or both, within the information storage and retrieval platform 8. In one example embodiment, a buyer may be a user that has accumulated value (e.g., commercial or proprietary currency), and is accordingly able to exchange the accumulated value for items that are offered for sale by the information storage and retrieval platform 8.

The tables 200 also include an items table 204 in which item records are maintained for goods and services that are available to be, or have been, transacted via the information storage and retrieval platform 8. Item records within the items table 204 may furthermore be linked to one or more user records within the user table 202, so as to associate a seller and one or more actual or potential buyers with an item record.

A transaction table 206 contains a record for each transaction (e.g., a purchase or sale transaction or auction) pertaining to items for which records exist within the items table 204.

An order table 208 is populated with order records, with each order record being associated with an order. Each order, in turn, may be associated with one or more transactions for which records exist within the transaction table 206.

Bid records within a bids table 210 relate to a bid received at the information storage and retrieval platform 8 in connection with an auction-format listing supported by an auction application 42 of FIG. 3. A feedback table 212 is utilized by one or more reputation applications 48 of FIG. 3, in one example embodiment, to construct and maintain reputation information concerning users in the form of a feedback score. A history table 214 maintains a history of transactions to which a user has been a party. One or more attributes tables 216 record attribute information pertaining to items for which records exist within the items table 204. Considering only a single example of such an attribute, the attributes tables 216 may indicate a currency attribute associated with a particular item, with the currency attribute identifying the currency of a price for the relevant item as specified in by a seller.

A search table 218 may store search information that has been entered by a user (e.g., buyer) who is looking for a specific type of listing. A synonym dictionary 220 may store synonyms for expanding constraints in a query that is received by the information storage and retrieval platform 8.

Figure 4B:
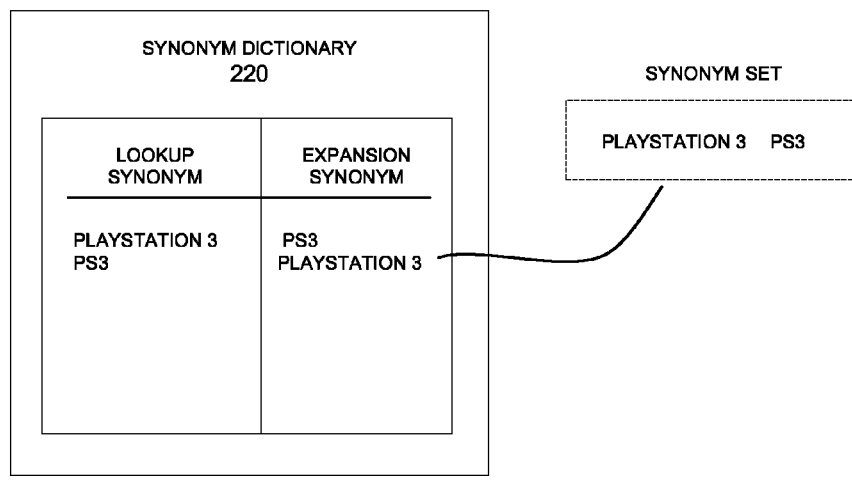
FIG. 4B is a block diagram illustrating a synonym dictionary, according to an embodiment.

FIG. 4B is a block diagram illustrating a synonym dictionary 220, according to an embodiment. The synonym dictionary 220 may include lookup synonyms that are associated with expansion synonyms. For example, the information storage and retrieval platform 8 may identify a constraint in a query as matching a lookup synonym and, responsive to the match, expand the constraint to include the expansion synonym. The synonym dictionary 220 is illustrated as storing constraints of a synonym set as lookup or expansion synonyms.

FIG. 5A is a block diagram illustrating an overview 250 of a method to generate demand information, according to an embodiment. Illustrated on the left are queries 252 that are received by the information storage and retrieval platform 8; illustrated in the middle are items 254 that may be retrieved based on the queries; and illustrated on the right are archetypes of the associated items in the form of products 256. The queries 252 may include different constraints (e.g., Q1, Q2, Q3 and Q4). The queries 252 may be processed to generate search results that include multiple items that are communicated back to the user. Responsive to the user selecting an item 254 from or via the search results, the information storage and retrieval platform 8 may register the item and its archetypical product 256 as associated with the query. For example, a user may enter the query 252 "PLAYSTATION 3 4 GB" that is processed by the information storage and retrieval platform 8 to return search results that include items 254 that match the constraints in the query 252 and are for sale on the information storage and retrieval platform 8 (e.g., network-based marketplace). Responsive to the user selecting an item 254 from the search results, the information storage and retrieval platform 8 may identify the item 254 as a product 256 as known and register the selection of the item as a selection of a product in association with the query. For example, the information storage and retrieval platform 8 may register the selection as demand information, described further below. According to the present example, the information storage and retrieval platform 8 may register the selection as a PlayStation®3, the third home video game console produced by Sony Computer Entertainment, Inc., a video game company specializing in a variety of areas in the video game industry of Tokyo, Japan.

FIG. 5B is a block diagram illustrating demand information 280, according to an embodiment. The demand information 280 is shown to include multiple instances of demand information 280 in columns of products identified by product titles 282 containing numbers that represent selections to view items that were subsequently identified as instances of the identified archetypical products. The demand information 280 may be being organized according to queries. For example, the first query (e.g., "PLAYSTATION 3 4 GB") is shown to be associated with a selection of "5" items identified according to an archetypical product with the product title, "product-1" (e.g., PlayStation®3). Further, the demand information 280 is shown to include a cluster of queries 284 where each query in the cluster may be clustered around a product. For example, the queries Q1, Q2 and Q3 are clustered around the "product-1" because the respective queries are registered with item selections for "product-1" that are respectively greater than item selections for any other product for the respective query. Accordingly, Q1 is registered as clustered around "product-1" because "product-1" has an item count of 5, "product-2" has an item count of 0, and "product-3" has an item count of 0.

Figures 6A, 6B:
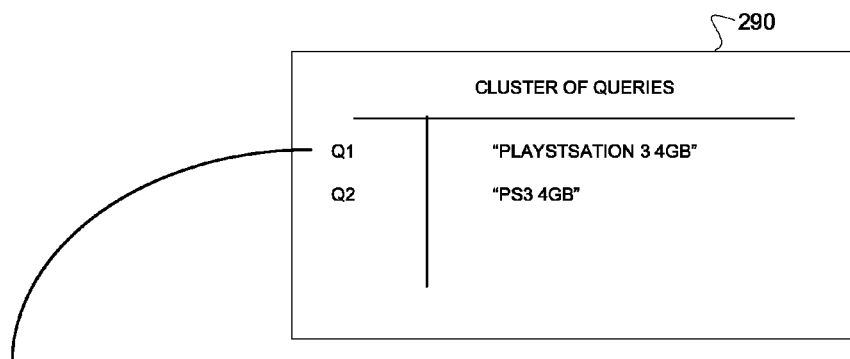
FIG. 6A is a block diagram illustrating a cluster of queries, according to an embodiment.
FIG. 6B is a block diagram illustrating a distance matrix, according to an embodiment.

FIG. 6A is a block diagram illustrating a cluster of queries 290, according to an embodiment. The cluster of queries 290 is shown to include two queries. The two queries may be defined as a cluster based on demand information 280, as shown in FIG. 5B, that peaks (e.g., highest count) for a common product.

FIG. 6B is a block diagram illustrating a distance matrix 300, according to an embodiment. The distance matrix 300 may be used to generate synonym sets by providing a filtering mechanism to remove constraints from the queries in a cluster of queries. The distance matrix 300 includes an X-axis and a Y-axis that are comprised of constraints from a query. For example, the illustrated distance matrix 300 includes an X-axis comprised of constraints from a query "Q1," as shown in FIG. 6A. The constraints may appear on the Y-axis in the distance matrix 300 as N-grams. For example, the distance matrix 300 is based on the query "PLAYSTATION 3 4 GB"

and is shown to include 1-grams in the form of "PLAYSTATION," "3," and "4 GB" and 2-grams in the form of "PLAYSTATION 3" and "3 4 GB". The intersections of the constraints of the distance matrix 300 may be used to store distance information that identifies the distance between the respective constraints within the query. For example, the distance between the constraint "PLAYSTATION," and the constraint "4 GB" in the query "PLAYSTATION 3 4 GB" may be 2. The information storage and retrieval platform 8 may utilize the distance matrix 300 to remove constraints that are associated with a distance that is greater than a predetermined threshold.

Figure 7A:
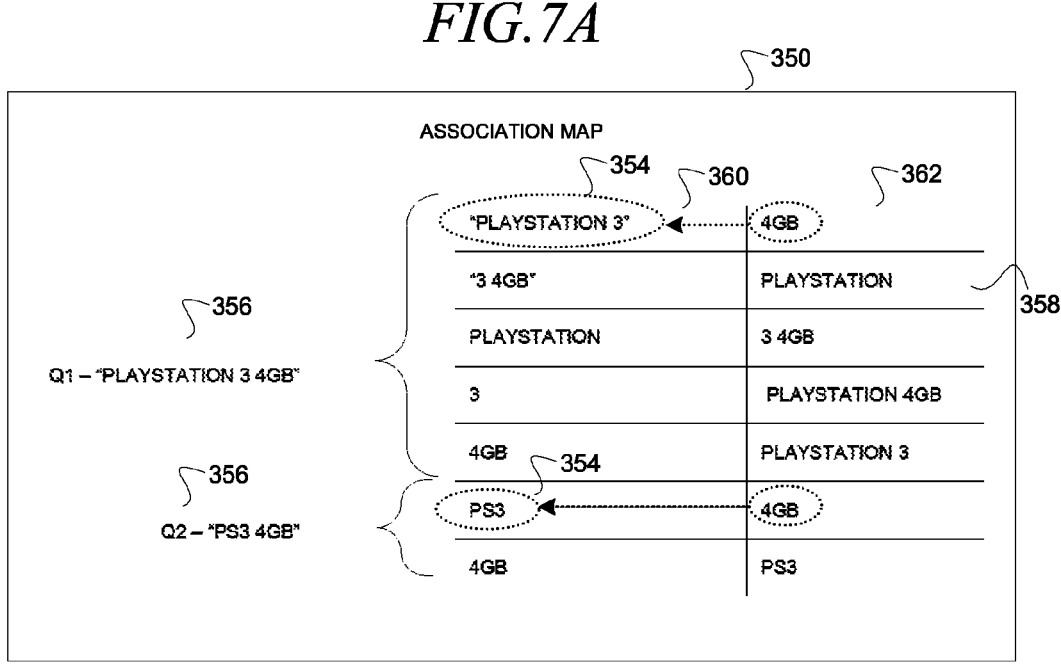
FIG. 7A is a block diagram illustrating an association map, according to an embodiment.

FIG. 7A is a block diagram illustrating an association map 350, according to an embodiment. The association map 350 may be utilized by the information storage and retrieval platform 8 to identify a synonym set 354 (e.g., "PLAYSTATION 3" and "PS3). The association map 350 may be generated from a set of constraints that are included in a group of queries that form a cluster of queries, as previously described. In one embodiment, the association map 350 may be generated from constraints that have first been filtered with a distance matrix 300, as described with reference to FIG. 6B. The association map 350 may be organized according to sections 356, rows 358 and columns 360, 362. Each section 356 may include rows 358 for a single query in a cluster of queries. Each row 358 may represent a permutation of the query that includes one constraint from the query in the column 360 and the remaining constraints from the query in the column 362. A constraint may be embodied as an N-gram of constraints that have been identified in the query, as described above. The association map 350 may be used to identify matching constraints in the column 362 to identify a synonym set 354 in the column 360. For example, the constraints "4 GB" from different queries may be identified as matched to identify the synonym set "PLAYSTATION 3" and "PS3."

Figure 7B:
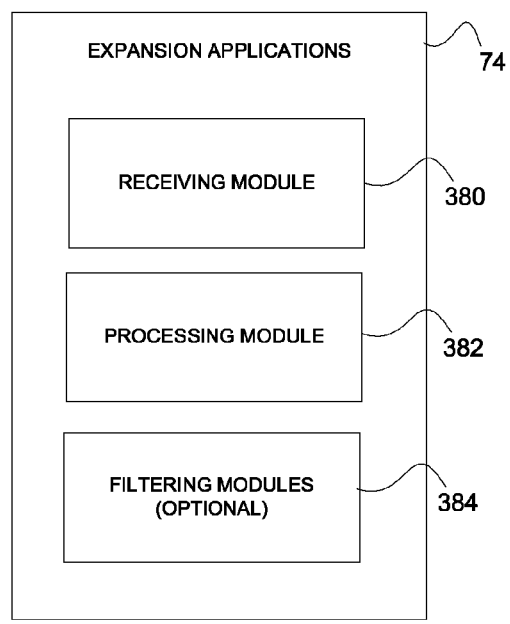
FIG. 7B is a block diagram illustrating expansion applications, according to an embodiment.

FIG. 7B is a block diagram illustrating expansion applications 74, according to an embodiment. The expansion applications 74 may include a receiving module 380, a processing module 382, and filtering modules 384. The receiving module 380 may receive queries from the users. In addition, the receiving module 380 may generate demand information 280, as previously described in association with FIG. 5B. The processing module 382 may process queries to identify clusters of queries and to identify synonym sets 354. In addition, the processing module 382 may process a query to identify a constraint in the query that may be used to lookup a synonym in the synonym dictionary to expand the constraint. The filtering modules 384 may be optionally used to filter constraints prior to the identification of synonym sets 354.

Methods of Operation

FIG. 8A is a block diagram illustrating a method 400, according to an embodiment, to generate a synonym dictionary 220. Operations on the left are performed by client machines 4 and operations on the right are performed by the information storage and retrieval platform 8. The method 400 commences at operation 402 with the client machine 4 communicating a query to the information storage and retrieval platform 8.

At operation 404, at the information storage and retrieval platform 8, the receiving module 380 may receive the query and store the query as demand information 280, as described in FIG. 9. Next, the information storage and retrieval platform 8 may generate search results based on the query and communicate the search results to the client machine 4. In response to receiving the search results, the user may enter selections. Some of the selections may identify items that were returned in the search results communicated in response to the query entered by the user. In one embodiment, the selections entered by the user subsequent to communication of a query may be identified as part of a click stream. In one embodiment, the click stream may commence with reception of the query and terminate based on a predetermined period of time or responsive to receipt of a specific type of selection (e.g., another query). Other embodiments may use other mechanisms to commence and/or terminate the click stream. The receiving module 380 may process the click stream to capture demand information 280. For example, the receiving module 380 may receive and register selections of items in association with the query. The receiving module 380 may register the selections of items in the form of archetypical product selections that are stored as demand information 280, as further described in FIG. 9.

At operation 406, the processing module 382 may identify clusters of queries based on the demand information 280. In one embodiment, the processing module 382 may identify clusters of queries responsive to receipt of the query. In another embodiment, the processing module 382 may identify clusters of queries asynchronous to receipt of the query. For example, the processing module 382 may execute periodically to identify clusters of queries. In one embodiment, the processing module 382 may execute periodically based on a predetermined schedule. At operation 408, the processing module 382 may identify synonym sets based on the cluster of queries. For example, the processing module 382 may utilize the constraints in the queries included in the identified cluster of queries to generate a distance matrix and an association map that are used to identify synonym sets, as further described in FIG. 11. In one embodiment the processing module 382 may invoke the filtering modules 384 to filter the synonym sets. At operation 412, the processing module 382 may store the synonym sets that have been identified and not filtered in the synonym dictionary 220 and the process ends.

FIG. 8B is a block diagram illustrating a method 450, according to an embodiment, to utilize a synonym dictionary 220. Operations on the left are performed by client machines 4 and operations on the right are performed by the information storage and retrieval platform 8. The method 450 commences at operation 452 with the client machine 4 communicating a query to the information storage and retrieval platform 8.

At operation 454, at the information storage and retrieval platform 8, the receiving module 380 may receive the query and store the query as demand information 280, as described in FIG. 9. At operation 456, the processing module 382 may identify the constraints in the query. For example, the following query may be received at the information storage and retrieval platform 8:

"PLAYSTATION 3 4 GB"

The processing module 382 may identify three constraints in the above query, the three constraints including "PLAYSTATION" and "3" and "4 GB." In one embodiment, the processing module 382 may identify constraints in phases as N-grams. For example, the constraints "PLAYSTATION" and "3" and 4 GB" may be identified as 1-gram constraints in a first phase. Also, for example, the constraints "PLAYSTATION 3" and "3 4 GB" may be identified as 2-gram constraints in a second first phase. That is, "PLAYSTATION 3" or any other N-gram may be utilized by the processing module 382 to access the synonym dictionary 220 to retrieve an expansion synonym (e.g., PS3). In one embodiment, the N for N-grams may be defined according to a predetermined threshold. At operation 458, the processing module 382 may utilize the constraint identified in the query (e.g., lookup synonym) to retrieve a constraint (e.g., expansion synonym)

from the synonym dictionary 220. At operation 460, the processing module 382 may use the retrieved synonym to expand the query. Continuing with the example provided above, the expanded query may appear as follows:

"("PLAYSTATION 3" OR "PS3") AND 3 AND "4 GB"

At operation 462, the processing module 382 may identify items in the database 36 based on the expanded query and communicate the identified items in search results to the client machine 4. At operation 464, the client machine 4 displays the search results to the user and the process ends.

FIG. 9 is a flow chart illustrating a method 500, according to an embodiment, to generate demand information 280. Operations on the left are performed by client machines 4 and operations on the right are performed by the information storage and retrieval platform 8. The method 500 commences at operation 502 with the client machine 4 communicating a query to the information storage and retrieval platform 8.

At operation 504, at the information storage and retrieval platform 8, the receiving module 380 may receive the query and at operation 506, the processing module 382 may generate search results based on the query. At operation 508, the processing module 382 may communicate the search results to the client machine 4.

At operation 510, the client machine 4 may receive the search results that include items that are selectable. Further, the client machine 4 may communicate a selection of one or more of the items to the information storage and retrieval platform 8. The selection may be part of a click stream, as previously described.

At operation 512, at the information storage and retrieval platform 8, the receiving module 380 may receive the selection. At operation 514, the processing module 382 may associate the item with a product that is an archetype of the item. For example, the processing module 382 may utilize a product catalogue to identify the product. At operation 516, the processing module 382 may store or register the identified product as demand information 280. For example, the processing module 382 may identify a query in the demand information 280 that matches the received query and increment a count for a product that corresponds to the matched query. Accordingly, the processing module 382 may map the selected item to a product and register the selection according to the product and the previously received query. At operation 518, the processing module 382 communicates an interface in response to the selection and at operation 520, the client machine 4 displays the interface.

Figure 10:
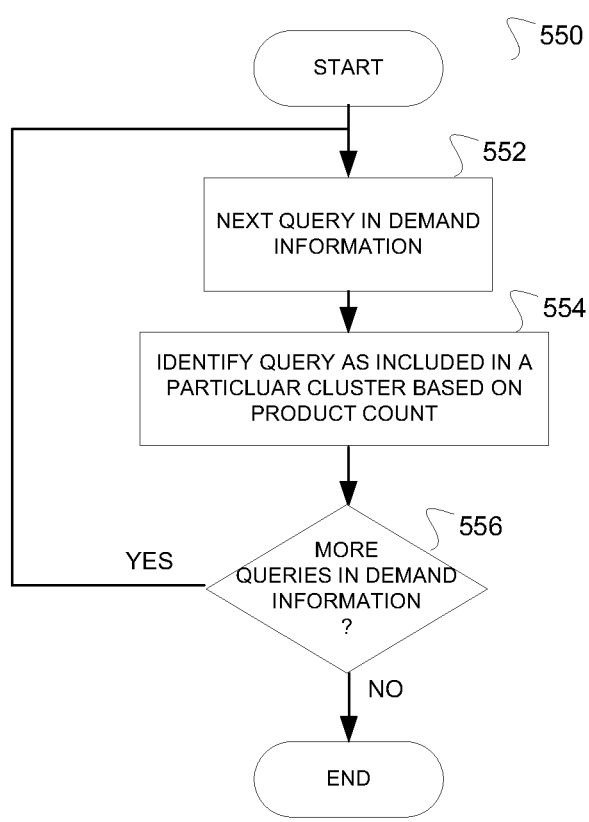
FIG. 10 is a flow chart illustrating a method, according to an embodiment, to identify a cluster of queries.

FIG. 10 is a flow chart illustrating a method 550, according to an embodiment, to identify a cluster of queries. The method 550 commences at operation 552 with the processing module 382 retrieving the next query from the demand information 280 from a sample of queries. At operation 554, the processing module 382 identifies the query as part of a particular cluster by comparing product counts. For example, the processing module 382 may identify the query as included in a cluster according to the product with the greatest product count. At decision operation 556, the processing module 382 identifies whether there are more queries in the demand information 280. If the processing module 382 identifies there are more queries in the demand information 280, then a branch is made to operation 552. Otherwise the process ends.

Figure 11:
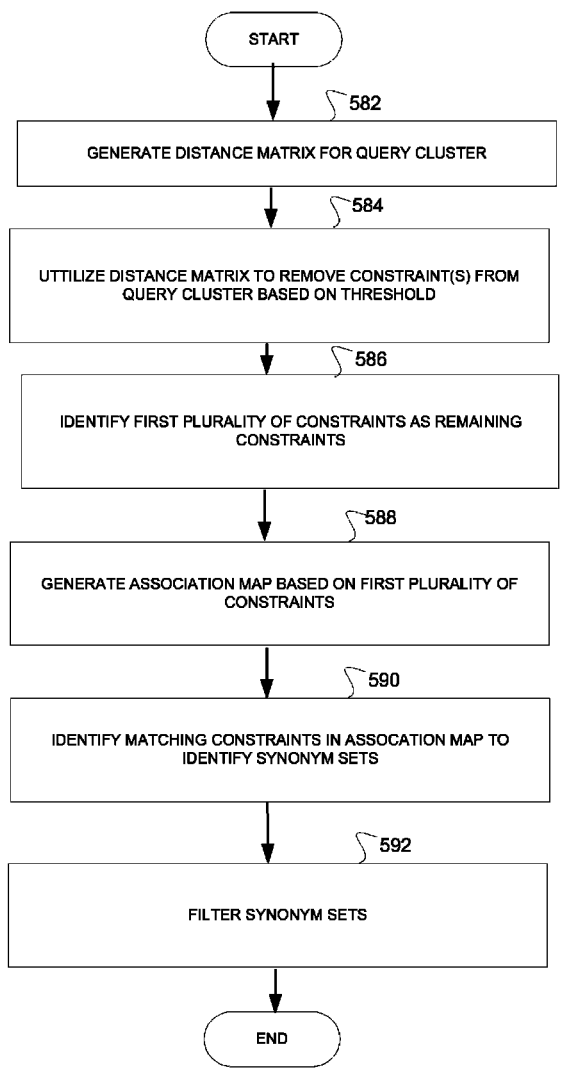
FIG. 11 is a flow chart illustrating a method, according to an embodiment, to identify a synonym set based.

FIG. 11 is a flow chart illustrating a method 580, according to an embodiment, to identify synonym sets. The method 580 commences at operation 582 with the processing module 382 generating a distance matrix 300 for each of the queries in a cluster. At operation 584, the processing module 382 may utilize the respective distance matrices 300 to remove constraints from each query based on a predetermined threshold. For example, in one embodiment, the processing module 382 may remove constraints from the query cluster that are greater than three positions apart. At operation 586, the processing module 382 may identify a first plurality of constraints as the remaining constraints after filtering based on the respective distance matrices 300. At operation 588, the processing module 382 may generate an association map 350 based on the unfiltered constrains. For example, the processing module 382 may generate the association map 350 to include sections 356 for each of the queries. The sections 356 may respectively include rows representing a permutation of the query that includes one constraint from the query in a first column 360 and the remaining constraints from the query in a second column 362, as previously described. At operation 590, the processing module 382 may identify matching constraints in the second column to identify a synonym set in the corresponding first column, as previously described. At operation 592, the processing module may invoke one or more filtering modules 384 to filter the synonym sets.

Optional Filtering

Figure 12:
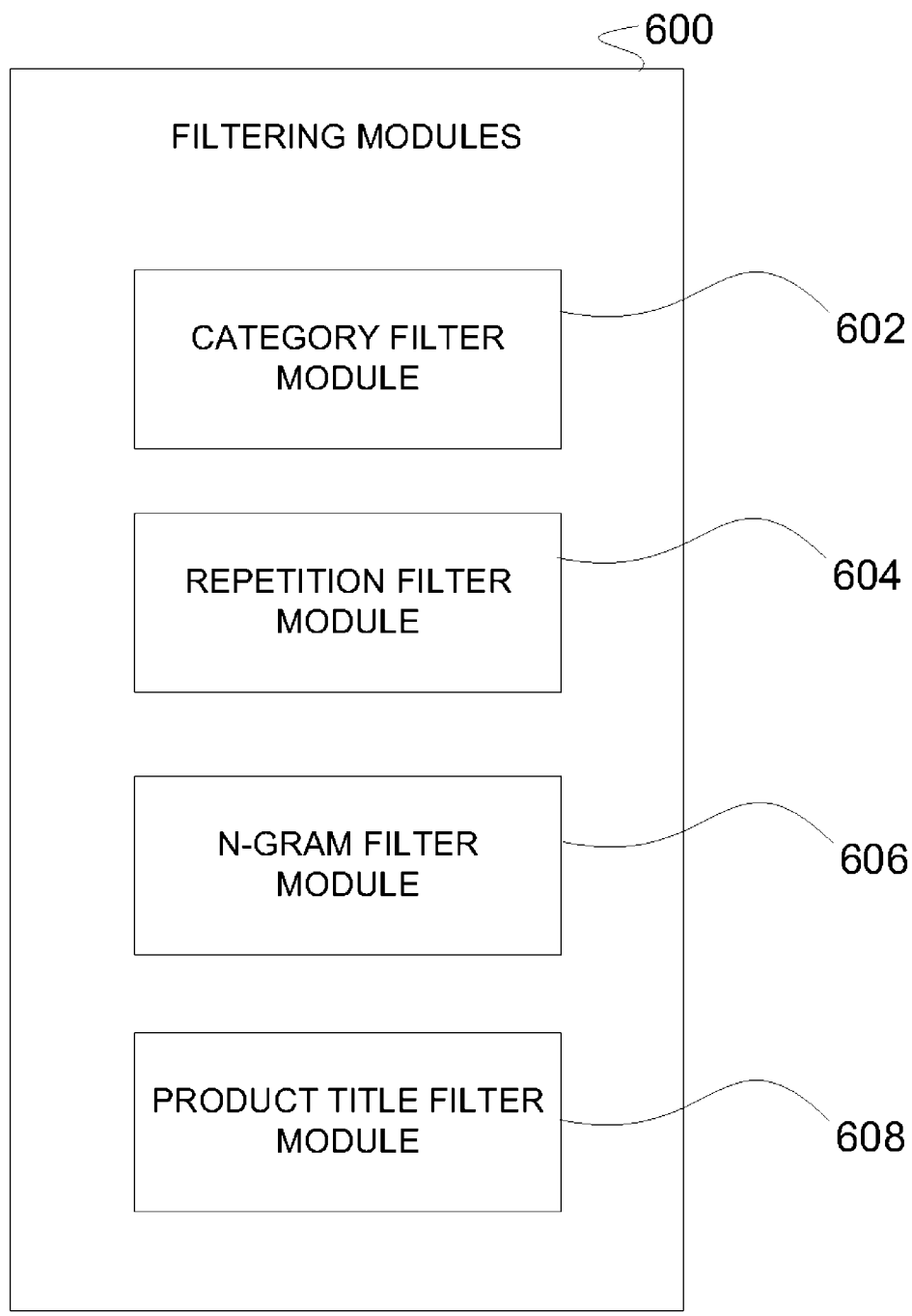
FIG. 12 is a flow chart illustrating filtering modules, according to an embodiment.

FIG. 12 is a flow chart illustrating filtering modules 600, according to an embodiment. The filtering modules 600 may be invoked by the processing module 382 to filter synonym sets. For example, the filtering modules 600 may be invoked by the processing module 382 as part of operation 592 on FIG. 11 to filter the synonym sets. The filtering modules 600 are shown to include a category filter module 602, a repetition filter module 604, an N-gram filter module 606, and a product title filter module 608.

Category Filter Module

The category filter module 602 may filter synonym sets based on a comparison of categories that corresponds to two sets of search results respectively generated based on the first and second synonyms of a synonym set. Consider the following synonym set:

"PLAYSTATION 3" "PS3"

By way of example, the category filter module 602 may utilize "PLAYSTATION 3" as a constraint in a query for the first search and "PS3" as a constraint in a query for a second search. The category filter module 602 may further identify a first list of categories that correspond to items that are returned in search results for the first search and a second list of categories that correspond to items that are returned in search results for the second search. For example, a seller or an algorithm may list an item in a category to facilitate identifying items for purchase for buyers who may browse a hierarchy of categories. Items may be returned in search results that are mapped to categories utilized to list the item. Next, the category filter module 602 may compare the list of categories associated with the first search with the list of categories associated with the second search to identify a number of matching categories. If the number of matching categories is less than a predetermined threshold, then the category filter module 602 may filter the synonym set by removing the synonym set.

Repetition Filter Module

The repetition filter module 604 may filter synonym sets based on a repetition of the first and second synonyms of a synonym set in the same query. The repetition filter module 604 operates on the principle that synonyms are not logically repeated in the same query. Consider the same synonym set:

"PLAYSTATION 3" "PS3"

By way of example, the repetition filter module 604 may utilize a sample of queries from which to identify a number of queries that include the "PLAYSTATION 3" and "PS3" constraints in the same query. If the number of queries that are identified to include both constraints is less than a predetermined threshold, then the repetition filter module 604 may filter the synonym set by removing the synonym set. In one embodiment, the sample of queries may include the set of queries utilized to generate demand information 280 that was utilized to identify the cluster of queries 284 from which the synonym set was extracted.

N-Gram Filter Module

The N-gram filter module 606 may be used to filter synonym sets based on a lack of repetition of an N-gram. The N-gram filter module 606 operates on the principle that a true N-gram logically repeats above a minimum threshold in a sample of queries. Consider the same synonym set:

"PLAYSTATION 3" "PS3"

By way of example, the N-gram filter module 606 may map the respective synonyms in the above synonym set to two queries from which the respective synonyms were derived. For each of the queries, the N-gram filter module 606 may generate all possible N-grams from the constraints that constitute the query. Next, for each N-gram, the N-gram filter module 606 may identify its frequency of occurrence in a set of sample queries. In one embodiment the set of sample queries may be the queries utilized to generate the demand information 280 that was utilized to identify the cluster of queries from which the above illustrated synonym set was extracted. If the frequency of occurrence is less than a predetermined threshold, then the N-gram filter module 606 may filter the synonym set by removing the synonym set.

Product Title Filter Module

The product title filter module 608 may filter synonym sets based on a product title for a cluster of queries 284. Consider the same synonym set:

"PLAYSTATION 3" "PS3"

By way of example, the product title filter module 608 may compare each of the above two constraints with the product title 282, as shown in FIG. 5B for the cluster of queries 284 from which the synonym set was generated. If the product title filter module 608 is unable to identify either of the constraints in the product title (e.g., Product-1), then the synonym set may be filtered by removing the synonym set.

Figure 13:
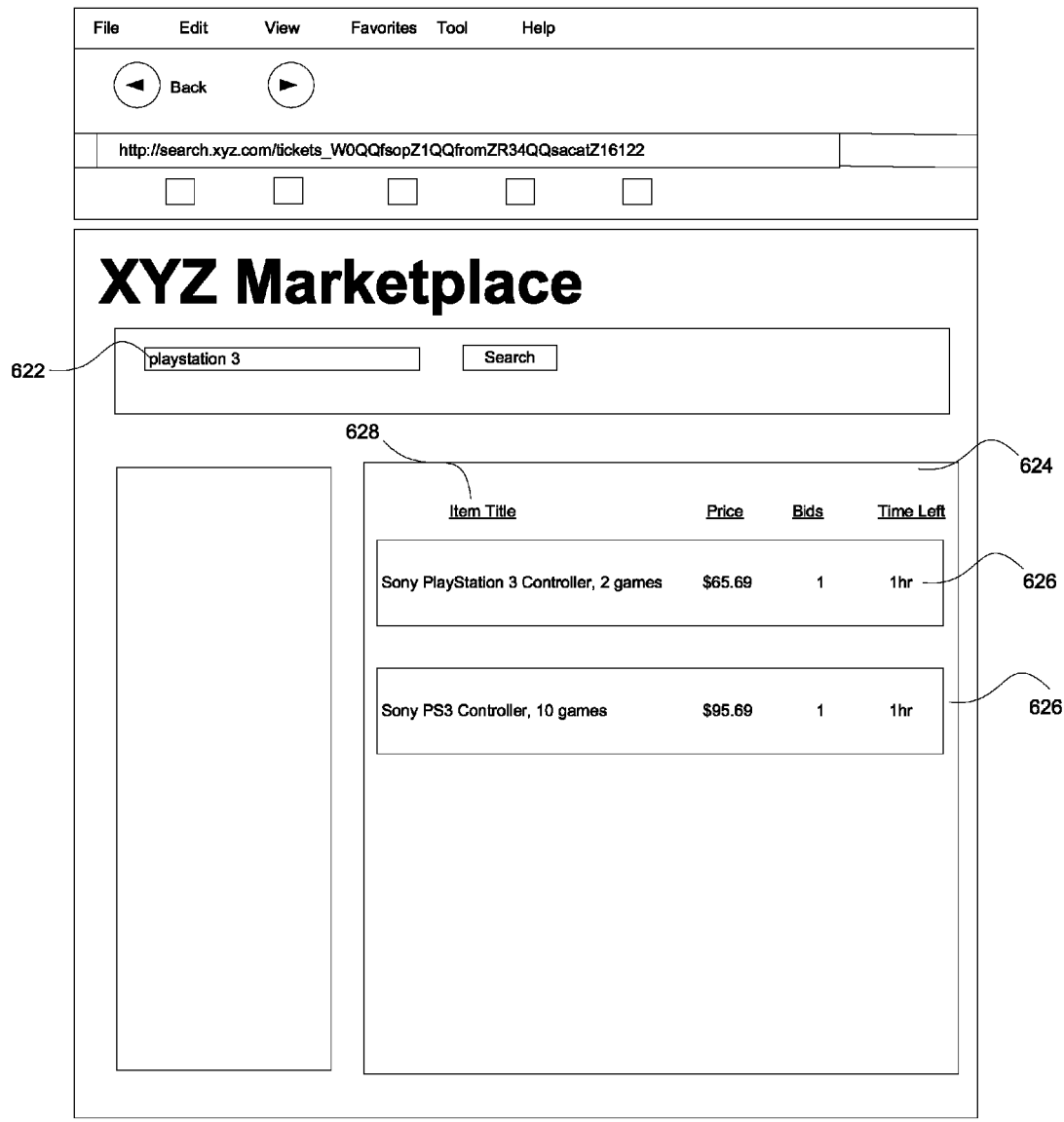
FIG. 13 is a diagram illustrating a user interface, according to an embodiment.
Figure 14:
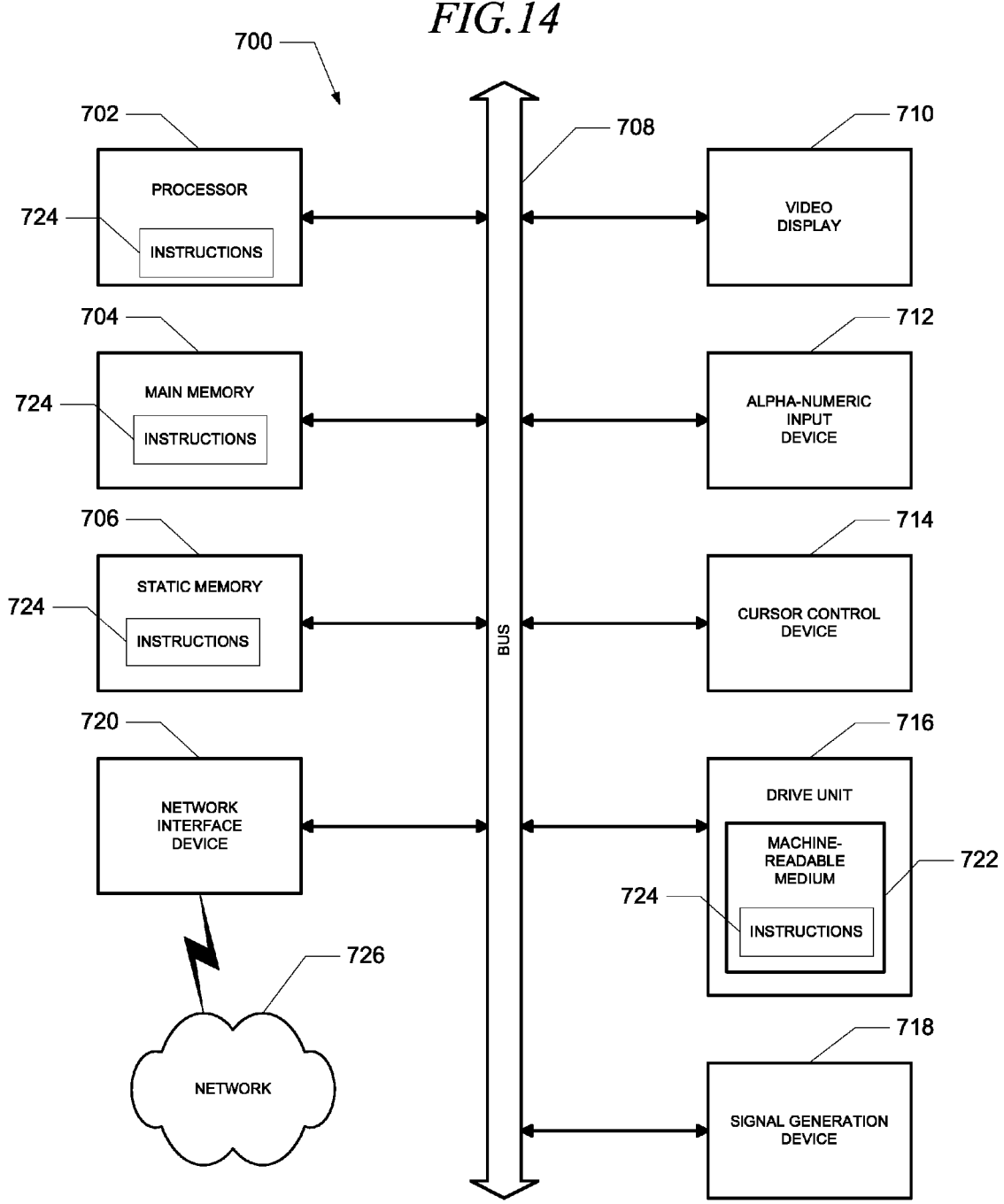
FIG. 14 shows a diagrammatic representation of a machine in the example form of a computer system, according to an example embodiment.

FIG. 13 is a diagram illustrating a user interface 620, according to an embodiment. The user interface 620 includes an input box 622 to receive a query from a user. For example, the input box 622 may be utilized by the information storage and retrieval platform 8 to receive a query. The interface 620 further includes search results 624 that are generated by the information storage and retrieval platform 8 based on the query. The search results 624 may include items 626 that respectively include titles 628 that include text that may be compared with constraints from a query. For example, a query may include a constraint "PLAYSTATION 3" that may be expanded to include the constraint "PS3" to search the database 36 ("PLAYSTATION 3" OR "PS3") to generate the search results 624.

In some embodiments, the methods described herein may be implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between multiple computer systems as various software components.

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), WAN, or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

FIG. 13 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g. a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions (e.g., software 724) may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g. configured by software), may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to generate and utilize a synonym dictionary are disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A system to generate a synonym dictionary, the system comprising:
    a computer processor;
    a memory coupled to the computer processor which, when executed by the computer processor, causes the computer processor to execute modules comprising:
    a receiving module to generate demand information based on a first plurality of queries,
    the first plurality of queries comprises a first query,
    the receiving module to identify search results based on the first query, the search results includes a first item,
    the receiving module to receive a selection over a network from a user that identifies the first item in the search results and responsive to the receipt of the selection:
        identify the first item as a first product, and
        store an association between the first query and the first product as an instance of demand information; and
    a processing module to identify a second plurality of queries as a first cluster of queries from the first plurality of queries based on the demand information,
        the demand information associated with the first cluster of queries is associated with a first plurality of search results that are associated with selections that identify items that are identified as the first product,
    the processing module to further identify a first synonym set based on an association map that comprises a first plurality of constraints identified from the second plurality of queries, the second plurality of queries includes a second query that includes at least two constraints and a third query that includes at least two constraints,
    the processing module utilizes the association map to identify the first synonym set including at least one constraint in the second query that matches at least one constraint in the third query, and
    the processing module to further store the first synonym set in a synonym dictionary.

2. The system of claim 1, wherein the processing module is to identify the first product is associated with the first cluster of queries.

3. The system of claim 1, wherein the first cluster of queries comprises the first query and wherein the first query comprises a first and second constraint and wherein the processing module is to generate a distance matrix that identifies a distance between the first and second constraint.

4. The system of claim 3, wherein the processing module is to identify the first constraint of the first query as included in the first plurality of constraints based on a position of the first constraint in the distance matrix and to identify the second constraint of the first query as not included in the first plurality of constraints based on a position of the second constraint in the distance matrix.

5. The system of claim 1, wherein the first synonym set comprises a first constraint and a second constraint that are synonyms.

6. The system of claim 1, wherein the synonym set includes a first synonym that is stored in the synonym dictionary, wherein the processing module is to:
    receive a query at an information storage and retrieval platform;
    retrieve the synonym from the synonym dictionary; and
    expand a constraint in the query based on the synonym.

7. A method to generate a synonym dictionary, the method comprising:
    generating demand information based on a first plurality of queries, the generating the demand information further comprising:
        identifying search results based on a first query, the search results including a first item,
        receiving a selection over a network from a user that identifies the first item in the search results and responsive to the receiving the selection:
            identifying the first item as a first product, and
            storing an association between the first query and the first product as an instance of demand information,
    the generating being performed by using a computer processor;
    identifying a second plurality of queries as a first cluster of queries from the first plurality of queries based on the demand information,
        the demand information associated with the first cluster of queries is associated with a first plurality of search results that are associated with selections that identify items that are identified as the first product; and
    identifying a first synonym set based on an association map that comprises a first plurality of constraints identified from the second plurality of queries, the second plurality of queries including a second query including at least two constraints and a third query including at least two constraints,
    the identifying the first synonym set including utilizing the association map to identify at least one constraint in the second query that matches at least one constraint in the third query; and
    storing the first synonym set in a synonym dictionary.

8. The method of claim 7, wherein the identifying the second plurality of queries as the first cluster of queries from the first plurality of queries comprises identifying a first product that is associated with the first cluster of queries.

9. The method of claim 7, wherein the first cluster of queries comprises the first query and wherein the first query comprises a first and second constraint and wherein the identifying the first synonym set comprises generating a distance matrix that identifies a distance between the first and second constraint.

10. The method of claim 9, wherein the identifying the first synonym set comprises identifying the first constraint of the first query as included in the first plurality of constraints based on a position of the first constraint in the distance matrix and identifying the second constraint of the first query as not included in the first plurality of constraints based on a position of the second constraint in the distance matrix.

11. The method of claim 7, wherein the first synonym set comprises a first constraint and a second constraint that are synonyms.

12. The method of claim 7, wherein the synonym set includes a first synonym that is stored in the synonym dictionary, the method of claim 11 further comprising:
    receiving a query at an information storage and retrieval platform;
    retrieving the synonym from the synonym dictionary; and
    expanding a constraint in the query based on the synonym.

13. A system to generate a synonym dictionary, the system comprising:
    at least one computer processor for executing:
    a receiving module to generate demand information based on a first plurality of queries, the first plurality of queries comprises a first query, the receiving module to identify search results based on the first query, the search results includes a first item, the receiving module to receive a selection over a network from a user that identifies the first item in the search results and responsive to the receipt of the selection:
   identify the first item as a first product, and
   store an association between the first query and the first product as an instance of demand information; and
means for identifying a second plurality of queries as a first cluster of queries from the first plurality of queries based on the demand information,
   the demand information associated with the first cluster of queries is associated with a first plurality of search results that are associated with selections that identify items that are identified as the first product,
   identifying a first synonym set based on an association map that comprises a first plurality of constraints identified from the second plurality of queries, the second plurality of queries including a second query including at least two constraints and a third query including at least two constraints,
   the identifying the first synonym set including utilizing the association map to identify at least one constraint in the second query that matches at least one constraint in the third query, and
   storing the first synonym set in a synonym dictionary.

14. A machine-readable medium storing instructions that, when executed by at least one computer processor, cause the at least one computer processor to perform operations comprising:

generating demand information based on a first plurality of queries, the generating the demand information further comprising:
   identifying search results based on a first query that is included in the first plurality of queries, the search results including a first item,
   receiving a selection over a network from a user that identifies the first item in the search results and responsive to the receiving the selection:
      identifying the first item as a first product, and
      storing an association between the first query and the first product as an instance of demand information;
identifying a second plurality of queries as a first cluster of queries from the first plurality of queries based on the demand information,
   the demand information associated with the first cluster of queries is associated with a first plurality of search results that are associated with selections that identify items that are identified as the first product; and
identifying a first synonym set based on an association map that comprises a first plurality of constraints identified from the second plurality of queries, the second plurality of queries including a second query including at least two constraints and a third query including at least two constraints,
the identifying the first synonym set including utilizing the association map to identify at least one constraint in the second query that matches at least one constraint in the third query; and
storing the first synonym set in a synonym dictionary.

* * * * *